(12) United States Patent
Ku

(10) Patent No.: US 9,819,915 B2
(45) Date of Patent: Nov. 14, 2017

(54) SMART LASER PHONE

(71) Applicant: Bon Hun Ku, Gyeonggi-do (KR)

(72) Inventor: Bon Hun Ku, Gyeonggi-do (KR)

(73) Assignee: Bon Hun Ku, Gyeonggi-do (KR)

( * ) Notice: Subject to any disclaimer, the term of this patent is extended or adjusted under 35 U.S.C. 154(b) by 0 days.

(21) Appl. No.: 15/129,970

(22) PCT Filed: Sep. 18, 2015

(86) PCT No.: PCT/KR2015/009810
§ 371 (c)(1),
(2) Date: Sep. 28, 2016

(87) PCT Pub. No.: WO2016/080646
PCT Pub. Date: May 26, 2016

(65) Prior Publication Data
US 2017/0251186 A1 Aug. 31, 2017

(30) Foreign Application Priority Data

Nov. 17, 2014 (KR) .......................... 10-2014-0159923

(51) Int. Cl.
*H04M 1/00* (2006.01)
*H04N 9/31* (2006.01)
(Continued)

(52) U.S. Cl.
CPC ......... *H04N 9/3129* (2013.01); *G02B 26/101* (2013.01); *G02B 26/123* (2013.01);
(Continued)

(58) Field of Classification Search
CPC .. H04N 9/3129; H04N 9/3155; H04N 9/3161; H04N 9/3164; G02B 26/101;
(Continued)

(56) References Cited

U.S. PATENT DOCUMENTS 7,352,499 B2 * 4/2008 Yavid ................... G02B 26/105
                                                          348/744
7,632,185 B2 * 12/2009 Solomon ............. G07F 17/3211
                                                          345/156
(Continued)

FOREIGN PATENT DOCUMENTS

KR    10-2008-0019460 A    3/2008
KR    10-2009-0046306 A    5/2009
KR     0-2014-0112984 A    9/2014

OTHER PUBLICATIONS

Samuel Lee Kwon, "Talking With a Palm", Oct. 8, 2010, retrieved from the Internet: <URL: https://web.archive.org/web/20101008175325/http://www.yankodesign.com/2010/10/07/talking-with-a-palm></URL:> See pp. 1-2; and figures 1-5.
(Continued)

*Primary Examiner* — Sonny Trinh
(74) *Attorney, Agent, or Firm* — The PL Law Group, PLLC

(57) ABSTRACT

A smart laser phone includes a main body with a mobile communication module, a band connected to the main body, an optical member, on a side surface of the main body to which the band is not connected, for projecting a laser image, a speaker on the same side surface as the optical member but separated by a set distance therefrom, a sensor unit on the surface between the optical member and the speaker, and a microphone on the outer side of the optical member. When the smart laser phone is worn on the wrist, the microphone and the optical member, the sensor unit and the speaker are sequentially equipped on the side surface of the smart laser phone main body oriented toward the palm, and thus, as the phone is used with an enlarged image, using the phone is convenient, and communication can be carried out with clear sound.

5 Claims, 8 Drawing Sheets

(51) Int. Cl.
*G02B 26/12* (2006.01)
*G02B 26/10* (2006.01)
*G06F 1/16* (2006.01)
*G06F 3/01* (2006.01)
*G06F 3/0346* (2013.01)
*H04B 1/3827* (2015.01)
*H04M 1/02* (2006.01)
*H04M 1/03* (2006.01)
*H04M 1/725* (2006.01)

(52) U.S. Cl.
CPC ......... *G02B 26/125* (2013.01); *G06F 1/1673* (2013.01); *G06F 3/017* (2013.01); *G06F 3/0346* (2013.01); *H04B 1/385* (2013.01); *H04M 1/0272* (2013.01); *H04M 1/03* (2013.01); *H04M 1/72519* (2013.01); *H04N 9/3155* (2013.01); *H04N 9/3161* (2013.01); *H04N 9/3164* (2013.01); *H04N 9/3173* (2013.01); *H04M 2250/54* (2013.01)

(58) Field of Classification Search
CPC ....... G02B 26/125; G06F 3/017; H04B 1/385; H04M 1/0272
USPC .............................. 455/100, 575.6, 95, 575.1
See application file for complete search history.

(56) References Cited

U.S. PATENT DOCUMENTS

| | | | |
|---|---|---|---|
| 8,478,366 B2* | 7/2013 | Shin | H04M 1/0241 353/119 |
| 8,666,447 B2* | 3/2014 | Cathey | G03B 21/00 345/205 |
| 8,774,861 B1* | 7/2014 | Cathey | G03B 21/00 455/556.1 |
| 2014/0334271 A1 | 11/2014 | Park et al. | |
| 2016/0291768 A1* | 10/2016 | Cho | G06F 3/0488 |
| 2016/0349790 A1* | 12/2016 | Connor | G06F 1/1694 |

OTHER PUBLICATIONS

Sunmam Kwon, "Wearable Mobile Device for Enhanced Chatting", Sep. 14, 2008; Retrieved from the Internet: <URL: https://web.archive.org/web/20080914135859/http://www.yankodesign.com/2007/10/02/wearable-mobile-device-for-enhanced-chatting></URL:> See p. 1; and figures 1-3.

* cited by examiner

SMART LASER PHONE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/009810, filed Sep. 18, 2015, which claims priority to the benefit of Korean Patent Application No. 10-2014-0159923 filed in the Korean Intellectual Property Office on Nov. 17, 2014, the entire contents of which are incorporated herein by reference.

TECHNICAL FIELD

The present invention relates, in general, to a smart phone and, more particularly, to a smart laser phone that may be operated by touching the display of a smart phone, which is projected onto the palm of the hand using a laser and a sensor, using a finger like a smart watch.

BACKGROUND ART

With the advancement of technology, the development of wearable computers has been accelerated.

Here, a wearable computer indicates a computer that may be naturally worn on the human body, as if clothing, a watch, glasses, an accessory or the like were being worn. Smart phones and tablet PCs may be easily used using a finger or a touch pen, but may be inconvenient because they must be carried in the hand, a pocket or a bag.

In contrast, a wearable computer is easy to carry compared to a smart phone or a tablet PC because it may be worn on the wrist or be worn like a pair of glasses.

Particularly, various smart watch products, through which various services, such as weather, messages, announcements, stock quotations and the like, may be retrieved in a wireless manner, are being released.

Meanwhile, a portable terminal is a portable device having one or more of a voice or video call function, a function of inputting and outputting information, a function of storing data, and the like.

With the diversification of functions, a portable terminal has a sophisticated function, such as capturing of a picture or video, playback of music or video files, execution of games, reception of broadcast services, or the like, and it is possible to implement a comprehensive multimedia player by installing these functions all together therein.

In order to implement a portable terminal having these sophisticated functions, new and various attempts involving hardware or software are being made. For example, a user interface environment through which a user may easily and conveniently search for or select a function is being provided.

Further, because a portable terminal is regarded as a personal device, a variety of designs are applied thereto in order to express the owner's individuality.

The structural form of a conventional portable terminal enables the handheld-size device to be carried in the hand or in a pocket. However, while the portable terminal is being carried, damage arising from the loss or fall thereof may occur.

In order to prevent such damage, the case in which a user wears the portable terminal like an article of clothing or an accessory has been proposed. In this case, if the portable terminal is worn on the wrist or aim like a normal watch, the portable terminal is required to realize good wireless network performance and good usability while having a small size in order not to adversely affect its appearance.

Further, when a smart phone is carried in a bag, it is inconvenient in that the owner is required to take the smart phone out of the bag in order to take or make a call or to use a message function. Also, there may be a problem in that the owner cannot receive a call or a message because he or she does not detect that the smart phone is ringing or vibrating in his/her bag.

As conventional technology for solving these problems, there is Korean Patent Application Publication No. 10-2009-46306, titled "Band-type portable terminal".

FIG. 1 is a front perspective view of a conventional band-type portable terminal.

Referring to FIG. 1, a portable terminal 1 includes a terminal body 10 having a display unit 11 arranged on the outer surface thereof, and the opposite ends of the terminal body 10 are connected with a band 20 formed in order to enable it to be worn on the wrist.

The display unit 11 outputs numbers, characters, and still or moving images depending on various modes of the portable terminal 1.

For example, the display unit 11 may be configured to display input numbers when the portable terminal 1 is in a calling mode, to display input text or numbers when the portable terminal is in a message-sending mode, to display a menu in order to enable searching for functions, and to display the current time when the portable terminal is in an idle mode.

On one side of the display unit 11, a manipulation unit 30 for input is arranged. The manipulation unit 30 may include a wheel 31 installed therein, which may rotate in a fixed position in order to quickly move a pointer or a cursor.

The wheel 31 may include push-button keys 32 and 33 at the opposite ends thereof, which may perform an input operation when pushed. Further, in order to enable the wheel 31 itself to perform an input operation when pushed, the wheel may include a switch in the lower part thereof.

A desired menu item or function may be quickly accessed by rotating the wheel 31 forwards or backwards, the corresponding function may be executed by pushing the wheel 31, and movement in a direction other than the direction indicated by the wheel 31 may be performed by pushing the push-button keys 32 and 33.

For example, in order to enable the input of characters or numbers, the portable terminal 1 enumerates numbers and alphabet characters in a display unit 11.

The enumerated numbers and alphabet characters are selected and designated by manipulating the wheel 31 or the push-button keys 32 and 33, whereby a telephone number or text, corresponding to the numbers or alphabet characters, is output through the display unit 11.

On the other side of the display unit 11, a sound output unit 12 for outputting sound is arranged. The sound output unit 12 may output a system alarm or voice depending on various modes of the portable terminal 1, or may output audio signals when multimedia data are reproduced. Furthermore, the sound output unit 12 may be used in a speakerphone mode while talking over the phone.

The band 20 is connected to the terminal body 10 in the form of a wrist watch. The band 20 may be configured such that outer covers, made of leather, rubber or plastic, are stacked, and antenna radiators 60 and 70 may be included in the interior of the band.

A fastener 26 may be placed at the part at which the opposite ends of the band 20 meet in order to be fastened to or unfastened from the wrist. A buckle, a snap-fit hook or the like may be applied to the fastener 26.

Accordingly, the portable terminal 1 may autonomously implement a wireless mobile communication function. That is, the selection of a desired function or input operation may be performed using the manipulation unit 30, a call may be made or taken through the manipulation, and menu items and functions may be retrieved and executed.

However, because this conventional smart watch is worn on the wrist, a display unit installed therein has a small size, and thus it is not easy to operate the smart watch while viewing the actual display.

Also, there is a problem in that while talking on the phone, the voice of the opposite side may not be clearly heard, and the phone owner is required to speak loudly.

SUMMARY

Accordingly, in order to solve the above problems, the present invention is intended to provide a smart laser phone that projects a laser image onto a wall, a desk or the palm of the hand, whereby the phone may be used through an extended display.

Also, another object of the present invention is to provide a smart laser phone that is operated in order to enable voice output from the phone to be clearly heard.

Also, a further object of the present invention is to provide a smart laser phone that enables a phone call to be made in a call standby state by distinguishing the call standby state from the usual state of the phone.

In order to accomplish the above objects, a smart laser phone according to an embodiment of the present invention may be configured to include a laser phone body having a mobile communication module and a display unit, a band connected to the opposite ends of the laser phone body, an optical means, formed on a side of the laser phone body to which the band is not connected, for projecting a laser image, a speaker, formed on the side on which the optical means is formed but spaced apart from the optical means by a predetermined distance, a sensor unit formed on the side between the optical means and the speaker, and a microphone formed on the outer side of the optical means, wherein when the smart laser phone is worn on the wrist, the microphone, the optical means, the sensor unit and the speaker are sequentially arranged on the side of the laser phone body in the direction that faces the palm of the hand.

According to the smart laser phone of the present invention, because it is possible to operate a phone using an extended laser image, the input of a key may be performed more easily.

Also, according to the smart laser phone of the present invention, because a microphone is located near the mouth and the sound output from a speaker is delivered using the palm of the hand, not only may a clearer voice call be realized, a resonance effect may also be achieved according to the shape of the palm.

Also, according to the smart laser phone of the present invention, a call standby state may be distinguished from the usual state of a phone, and a phone call may be made in the call standby state, whereby the phone call may be made without loss of phone conversations.

DETAILED DESCRIPTION

Terms and words used in the specification and claims should not be construed as being limited to ordinary meanings or dictionary definitions. Based on the fundamental rules whereby an inventor can appropriately define the meanings of terms in order to describe the invention using the best method, the terms and words used in the specification and claims should be construed consistently with the technical spirit of the invention.

Through the specification, when it is said that some part "includes" a specific element, this means that the part may further include other elements, without excluding them, unless otherwise mentioned. The terms "unit", "part", "module", and "device" used herein indicate a unit that executes at least one function or operation, and may be implemented in hardware, software or a combination thereof.

While terms such as "first" and "second," etc., may be used to describe various components, such components must not be understood as being limited to the above terms. The above terms are used only to distinguish one component from another. For example, a first component may be referred to as a second component, and likewise a second component may be referred to as a first component.

The term "and/or" should be understood as including all of combinations that can be made from one or more relevant items. For example, the expression "the first item, the second item, and/or the third item" means not only the first, the second, or the third item, but the combination of all of items that can be made from two or more of the first, second, or third items.

It will be understood that when an element is referred to as being "connected" to another element, it can be directly connected to the other element or intervening elements may be present. Other words used to describe the relationship between elements, that is, "between" and "directly between", or "adjacent" and "directly adjacent", etc. should be similarly interpreted.

Hereinafter, an embodiment of the present invention will be described with reference to the drawings.

Figure 1:
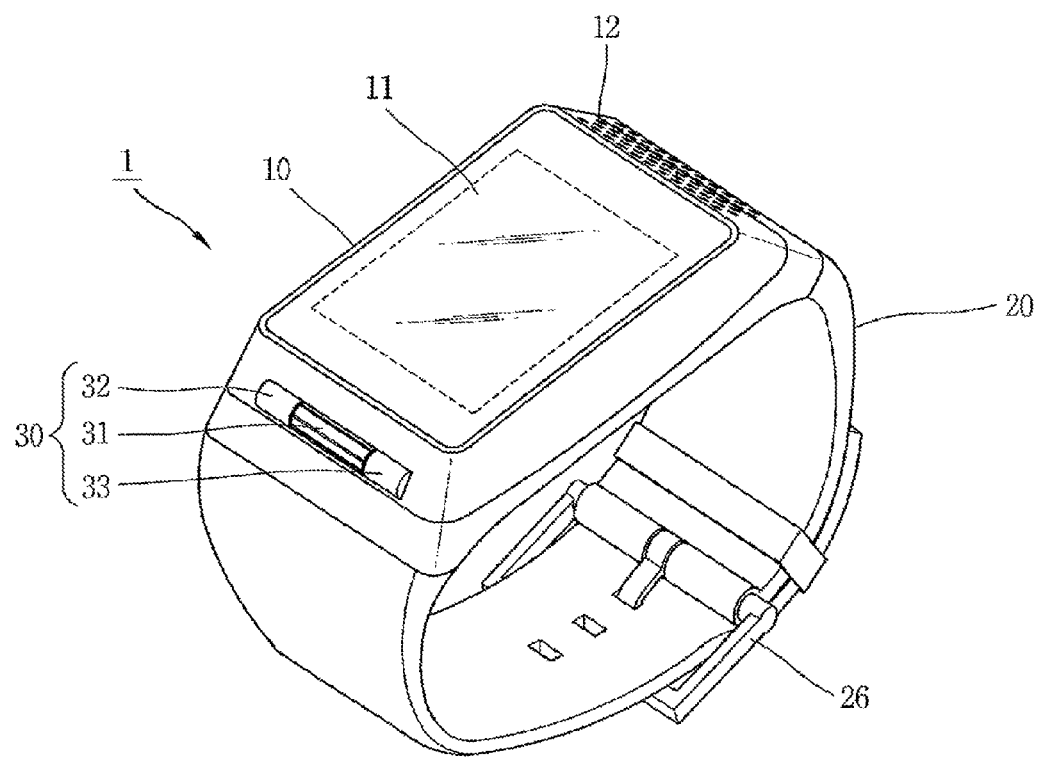
FIG. 1 is a perspective view of a conventional smart watch.
Figure 2:
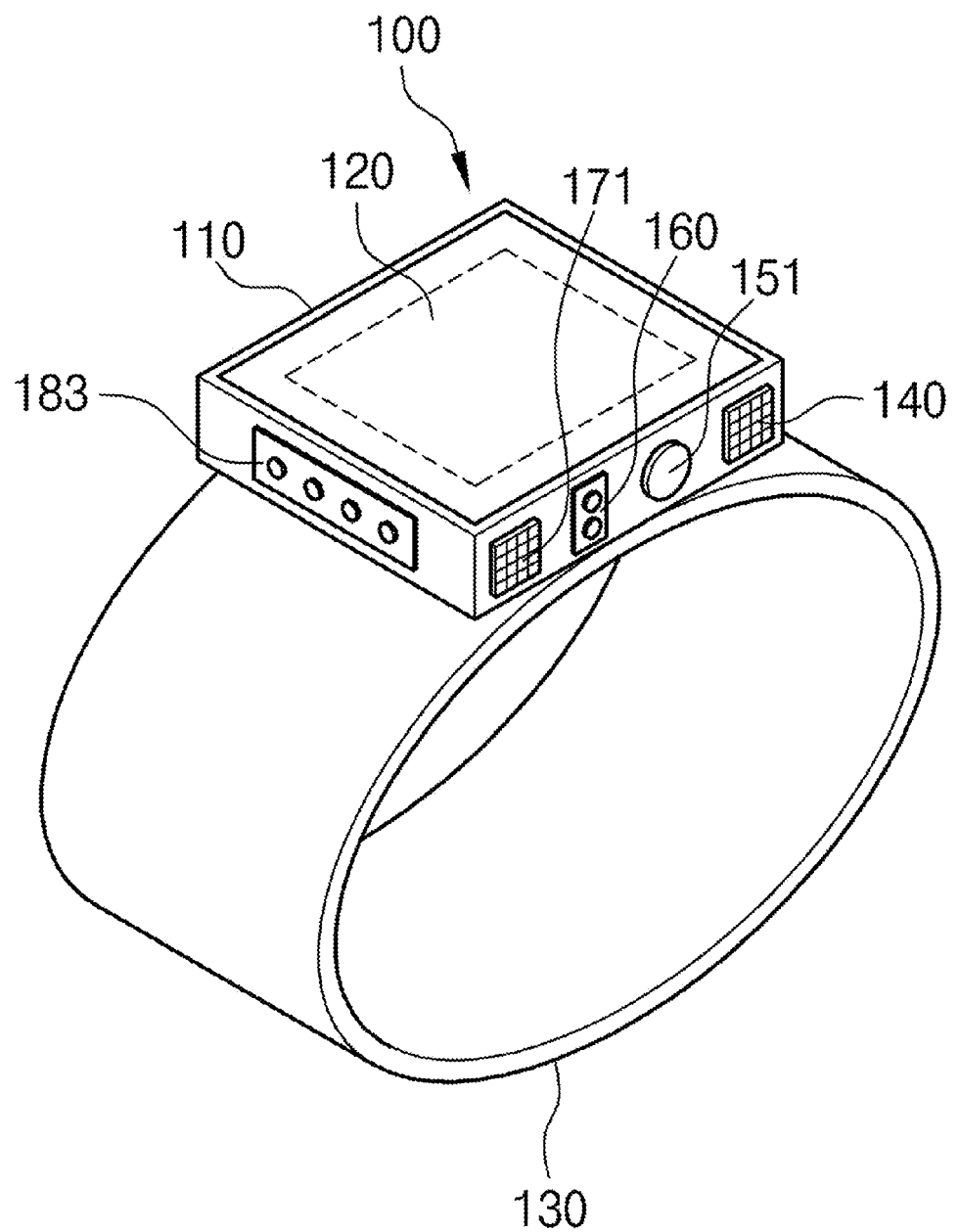
FIG. 2 is a perspective view of a smart laser phone according to an embodiment of the present invention.

FIG. 2 is the perspective view of a smart laser phone according to an embodiment of the present invention.

As illustrated in the drawing, the laser phone 100 of the present invention includes a display unit 120 on the upper part thereof.

On the side of the laser phone, a microphone 140, an optical means 151, a sensor unit 160 and a speaker 171 are sequentially arranged. Accordingly, when a command image, projected through the optical means 151, is touched using a finger or a pointer, the corresponding command is recognized, and the laser phone is activated, whereby the laser phone may be used like a common smart phone.

To this end, the laser phone 100 includes a laser phone body 110; a wrist band 130 connected to the opposite ends of the laser phone body; an optical means 151, formed on the side of the laser phone body to which the wrist band 130 is not connected, for projecting a laser image; a speaker 171, formed on the side on which the optical means 151 is formed but spaced apart from the optical means 151 by a predetermined distance; a sensor unit 160, formed on the side between the optical means 151 and the speaker; and a microphone 140, formed on the outer side of the optical means 151. When the smart laser phone of the present invention is worn on the wrist, the microphone 140, the optical means 151, the sensor unit 160 and the speaker 171 may be sequentially arranged on the side of the laser phone body in the direction that faces the palm of the hand.

First, the optical means 151 is configured to enlarge the deflection region of a projected laser beam so as to have the size of the palm or the back of the hand, in which case the laser beam incident on the optical means 151 is provided from the image creation means 150.

Figure 4:
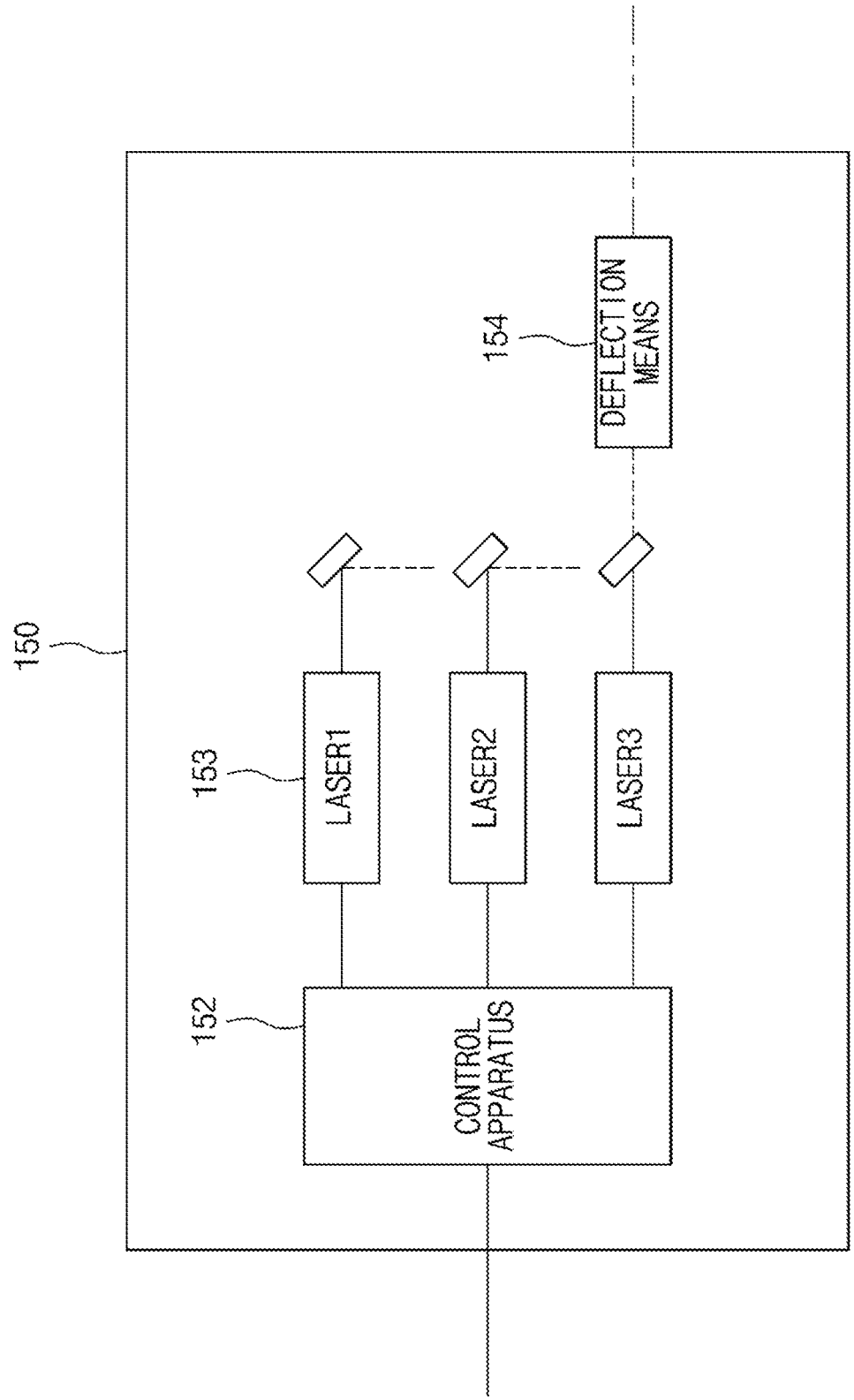
FIG. 4 is a block diagram that shows the detailed configuration of the image creation means of FIG. 3.

Referring to the detailed block diagram of the image creation means in FIG. 4, the image creation means 150 projects an image that is the same as the image to be displayed in the display unit 120 through a laser.

To this end, the image creation means includes three lasers 153 for receiving an image to be displayed in the display unit 120 and emitting a laser beam, and a deflection means 154 for deflecting each of the laser beams emitted from the lasers 153 along the lines in the x and y directions. Accordingly, a deflection region formed by the laser beams, emitted from the deflection means 154, is enlarged by the optical means 151 so as to have the size of the palm, and is then projected.

Here, the control apparatus 152 controls the intensity of the laser beam and the deflection means 154 by being electrically connected to the image creation means 150. Here, the control apparatus receives the image to be displayed in the display unit 120 and controls the intensity of the laser beam in order for the optical means 151 to radiate a laser beam having an intensity that is not injurious to a person on the palm of the hand.

That is, the laser 153 is controlled by a signal for adjusting the intensity of the laser beam in order to enable each of the low points of the projected image to have the required brightness on the palm or back of the hand and emits laser beams in a raster scan manner through the deflection means 154, whereby all points of the image are sequentially projected onto the image plane on the palm.

To this end, the deflection means 154 includes a polygonal mirror 154a for deflecting laser beams to the line in the x direction, the polygonal mirror 154a having an outer circumference formed in polygonal surfaces in order to emit the laser beams radiated from the laser 153 in a raster scan manner, and a rotational mirror 154b for deflecting the laser beams from the polygonal mirror 154a in the y direction.

Similar to an existing television configured with a cathode-ray tube, the laser 153 functions as a single electron gun or as multiple electron guns when color display is required, and the polygonal mirror 154a and the rotational mirror 154b displace the magnetic or electrostatic deflection of a known electron beam.

The sensor unit 160 includes a motion detection sensor 161 and a command recognition sensor 162 in order to detect the positional movement of the laser phone and to recognize the input of a touched key.

When any one of the patterns projected onto the palm of the hand is touched, the command recognition sensor 162 recognizes the corresponding command and sends the control unit 190 the data that are mapped thereto in order to execute the command, whereby the control unit may determine the input command.

To this end, a table, in which each command matches coordinates based on a mode displayed on the palm, is stored in the memory 185, and when coordinates related to a touched key in a predetermined mode are input from the command recognition sensor 162, the table is searched for the command corresponding to the coordinates and the command is executed.

Figure 5:
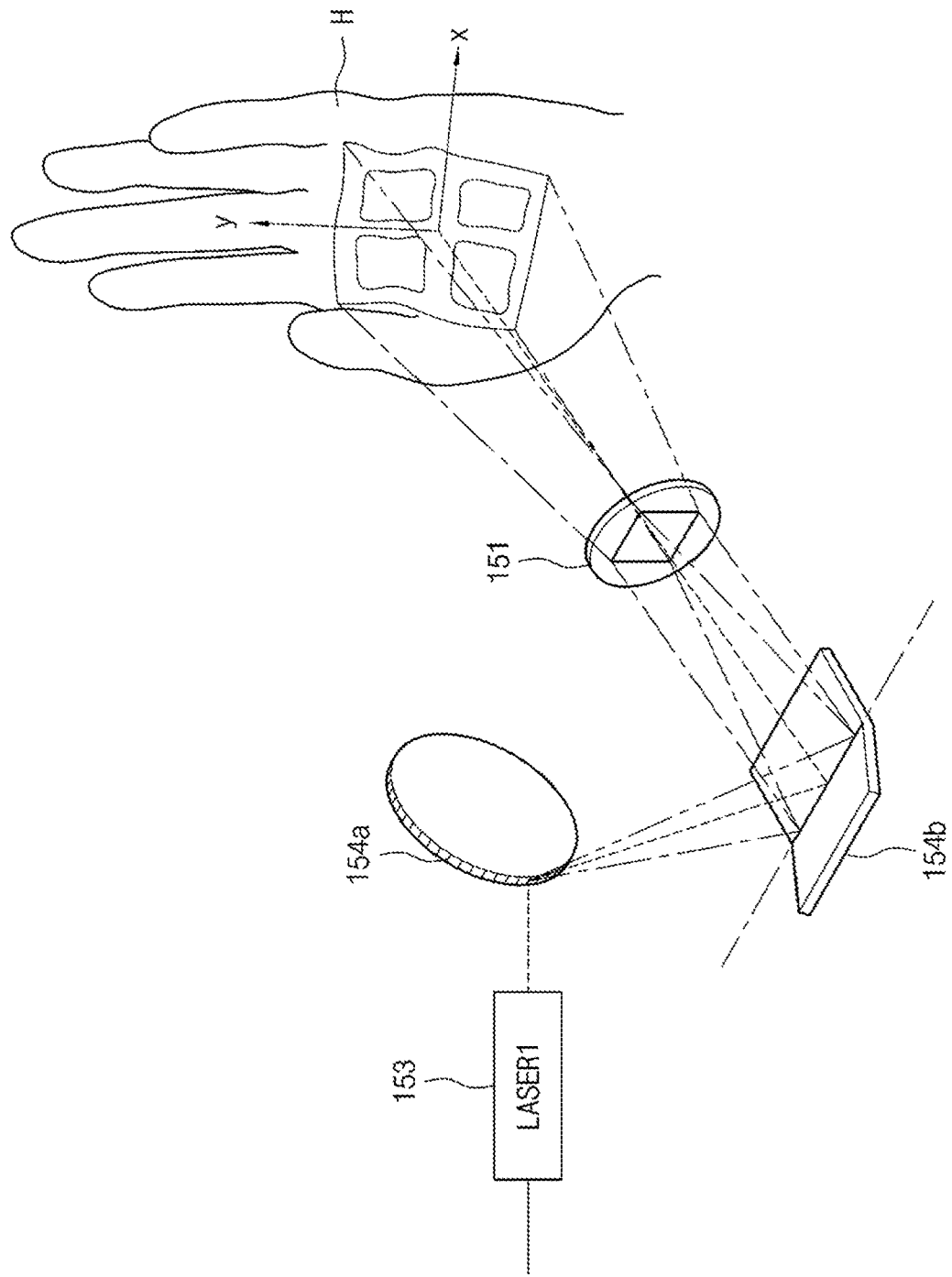
FIG. 5 is a block diagram for describing the operation of the deflection means of FIG. 4.

The command recognition sensor 162 is an apparatus capable of sensing one or more patterns (which are related to key commands) projected onto a palm, but because there may be four or more patterns related to commands, as shown in FIG. 5, a sensor capable of sensing X and Y coordinates is used.

As such a sensor, an IR LED sensor or a laser scanner may be used, but without limitation thereto, a sensor that may sense a specific pattern, selected using a finger or a pointer from among multiple patterns displayed in a predetermined area, is enough in the present invention.

For reference, when an IR LED sensor is used, a preset function is activated when the movement of an object is detected, and the position of a finger that moves for input is detected using the refraction of light.

In other words, if an infrared ray output from a sensor reaches an object such as the finger of a user or a pointer, the direction of the infrared ray is changed, and an IC detects the change and sends a signal corresponding thereto to the control unit 190, whereby the input of a specific key may be recognized.

Also, a laser scanner may use a time difference measurement method, a triangulation method, a phase difference measurement method or the like.

When a measurement method using a phase difference is employed, an electric signal in which the phase and intensity of the laser are reflected is generated, and a sensor compares the phase and intensity of the emitted signal with those of the reflected signal and calculates the distance using Equation (1):

$$L = \left(\frac{1}{2} * \theta\right) \bigg/ \left(\frac{f}{c} * 2\pi\right) \quad \text{[Equation 1]}$$

where L denotes the distance to the object, θ denotes the phase difference, f denotes a laser frequency, and c denotes the speed of light.

In the case of the phase difference measurement method, when a sensor is used in an actual environment, the intensity of the laser signal that returns by being reflected from an object is decreased due to external factors such as the distance to the object, the angle with the object, the optical reflectance of the object, and the like.

Because it is difficult to calculate the phase difference from the laser signal having the decreased intensity, the process of amplifying the signal may be performed before the signal is interpreted, but the error in the measurement may occur during this process.

Particularly, because the skin of a palm has a low reflectance, when the coordinates on the palm are measured using a laser scanner, it is necessary to consider the error that occurs in the measured distance depending on the reflectance.

The motion detection sensor 161 is configured to detect the movement of a palm, that is, the movement from the position of the palm placed in order to view the image projected from the laser phone to the position of the palm that is put to the ear in order to make a call.

Specifically, the motion detection sensor 161 considers the following situation. When the image, emitted from the laser phone worn on the wrist, is displayed on the palm of the hand and a call button on the palm is pushed, it takes time to move the hand to the ear after the call button is pushed. Accordingly, if a call is connected before moving the hand, a caller may not be able to talk on the phone while moving the hand.

In order to prevent this problem, when it is determined through the command recognition sensor 162 that a call button key is pushed, the control unit 190 does not immediately connect a call but delays the call connection for a certain time, which may correspond to the time taken to move the hand from the position at which the hand is placed in order to view the image projected onto the palm to the position near the ear to make a phone call, or it may connect a call after detecting the movement of the position of the laser phone.

In the present invention, a call is connected when the movement of the phone is detected using the motion detection sensor, whereby a caller may talk on the phone.

Accordingly, when the motion detection sensor 161 is operated after the input of a command is sensed using the command recognition sensor 162, the control unit 190 determines the change in position and activates the microphone 140 and the speaker 171 immediately while starting to connect a call using the mobile communication module 182.

The motion detection sensor 161 may use a sensor capable of merely sensing a position, and an example thereof will be described with reference to the drawing.

Figure 6:
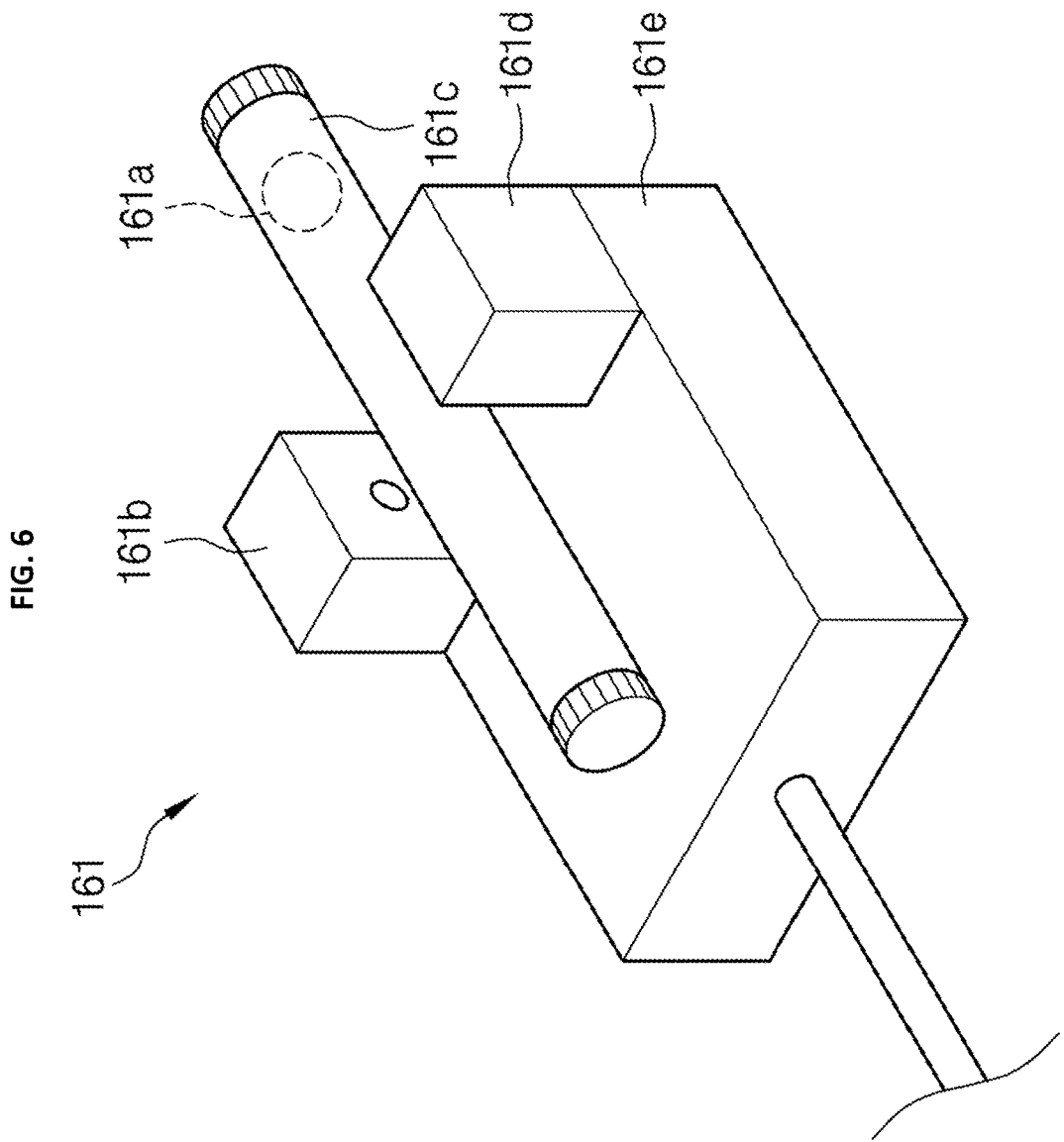
FIG. 6 is a reference drawing for describing the operation of a motion detection sensor.

The example is illustrated in FIG. 6.

FIG. 6 is a reference drawing for describing the operation of a motion detection sensor, and the motion detection sensor is configured such that a cylindrical transparent housing 161*c*, which contains a mover 161*a* therein, is arranged across the light shield area or the sensing area of a transmission photo-sensor 161*b* and 161*d*.

Here, the shape of the transparent housing is not limited to the cylindrical shape, but has a suitable shape depending on the circumstances.

The mover 161*a* inside the transparent housing 161*c* may linearly travel back and forth in the housing 161*c*.

For example, when the tilting of a position sensor causes a change in the slope or the position, the mover 161*a* linearly moves along the straight path formed in the housing due to gravity, whereby the mover 161*a* momentarily blocks the emission of light from the light emission unit 161*b* to the light reception unit 161*d* of the transmission photo-sensor 161*b* and 161*d*.

The mover 161*a* is an iron ball or an object similar thereto, and may use any object that may block light while rolling along the path inside the housing 161*c*.

When the light is blocked, the transmission photo-sensor outputs a sensing signal through an input/output terminal. Accordingly, the sensing signal is processed by the control unit 190, whereby the movement of the position is recognized.

Therefore, using the above-mentioned method, the motion detection sensor may sense the position, or more specifically, the change in the position.

Also, two motion detection sensors 161 may be used together in order to respectively sense the position in the horizontal axis and the position in the vertical axis.

Generally, the movement of an object may be divided into a horizontal component and a vertical component.

Accordingly, when the two sensors are installed so as to be perpendicular to each other, the paths along which the mover 161*a* travels in the housing 161*c* of the motion detection sensor are perpendicular to each other. In this case, if the motion detection sensor moves up and down, the mover of the motion detection sensor moves along the vertical axis, whereby the change in position is detected.

Meanwhile, if the motion detection sensor horizontally moves, the mover moves along the horizontal axis, whereby the change in position is detected.

That is, when the position of the laser phone changes, it may be divided into horizontal movement and vertical movement, and the horizontal movement and the vertical movement respectively cause the movement of the mover along the horizontal axis and the movement of the mover along the vertical axis, whereby the change of the position is sensed and the sensing signal is generated.

To this end, the average value of the output data of the motion detection sensor 161, related to movement from a usual state, in which the palm is unfolded in order to enable key input, to a call standby state, in which the palm is put to the ear, is acquired through multiple tests and is stored in the memory 185, whereby the data output from the motion detection sensor 161 are compared with the average value and whether the state is changed to the call standby state may be determined.

Although not illustrated, in another embodiment, the time taken to put the phone to the ear after a call button key is pushed in a usual state is averaged, and a call may be connected after the average time.

Also, the laser phone body 110 is formed so as to support various components on the frame thereof, in which case other components needed for configuring the smart laser phone of the present invention may be embedded in the body.

Figure 3:
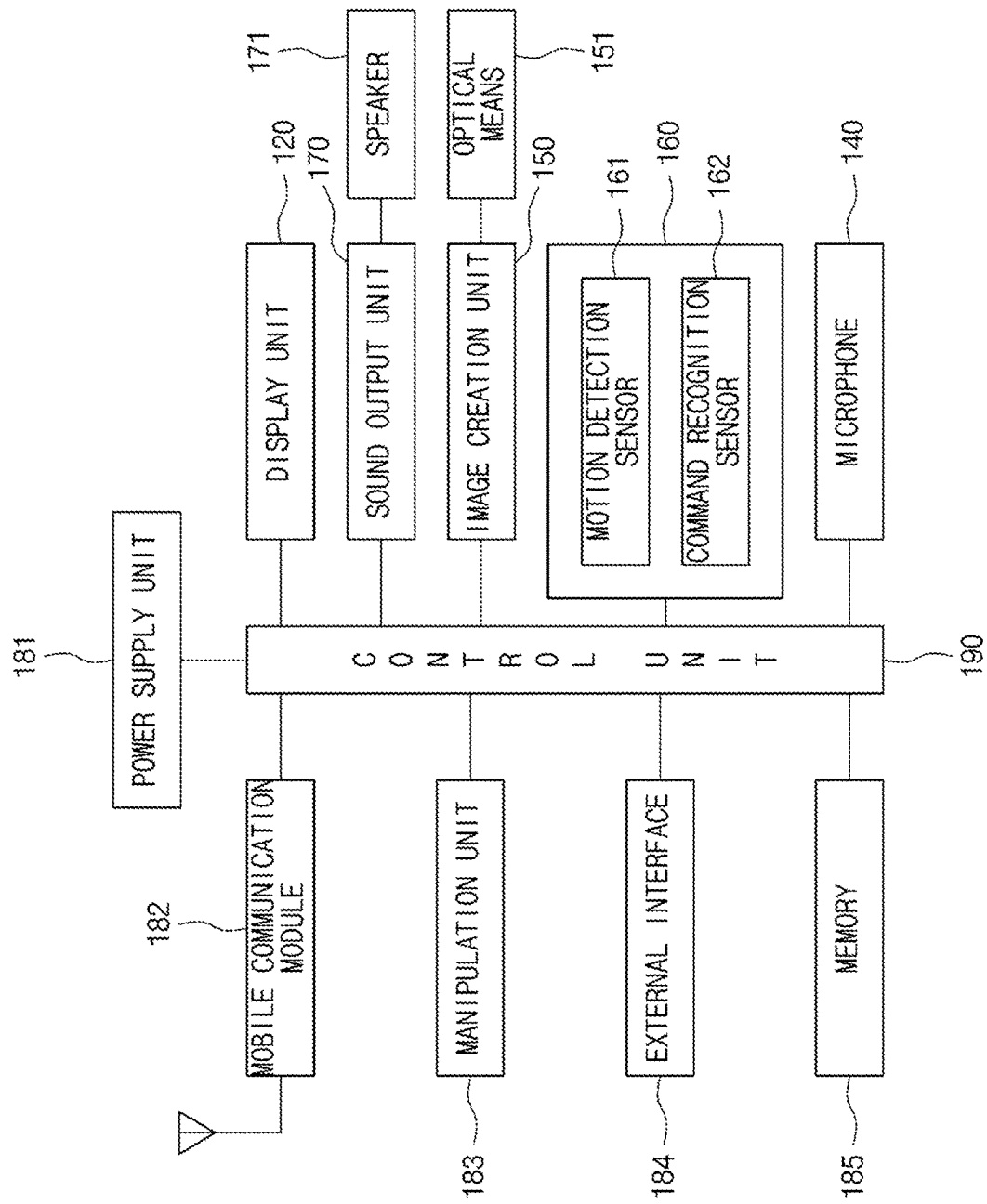
FIG. 3 is a block diagram that shows the main components of a smart laser phone according to an embodiment of the present invention.

Referring to the block diagram illustrating the main components of the smart laser phone according to an embodiment of the present invention in FIG. 3, a mobile communication module 182, a sound output unit 170, an image creation means 150, a power supply unit 181, memory 185 and the like may be arranged so as to be electrically connected with each other in the laser phone body 110.

The mobile communication module 182 serves to transmit and receive voice data, text data, image data and control data by transmitting or receiving wireless signals to or from a mobile communication base station through an antenna radiator (ANT) in order to perform functions associated with common mobile communication, and includes a transmission unit (not illustrated) for encoding a signal to be transmitted and transmitting the encoded signal and a reception unit for decoding a received signal.

The display unit 120 displays a User Interface (UI) or a Graphic User Interface (GUI) related to making phone calls, and may be used as an input apparatus related to the manipulation of a key, which is input by a user in order to control the operation of the terminal. Also, it may be configured such that a key may be manipulated through a separate manipulation unit 183.

Also, the display unit 120 is arranged inside the transparent window of the phone body, and is configured to include a liquid crystal display (LCD) module, an Organic Light- Emitting Diode (OLED) module, and a touch screen, through which intonation may be visually represented, whereby a user may input information by touching it.

The sound output unit 170 is configured to output sound data received from the mobile communication module in a call signal reception and calling mode, a recording mode, a voice recognition mode, or a broadcast service reception mode, or to convert the sound data stored in the memory 185 and output the converted data to the speaker 171.

The external interface 184 functions as an interface between the smart laser phone and all of external devices connected to the phone body, such as a wired or wireless headset, an external charger, a wired or wireless data port, a card socket (for example, a memory card or a SIM/UIM card) and the like.

The external interface 184 receives data or power from the external devices and delivers the data or power to the components inside the mobile terminal, or sends the data stored in the mobile terminal to the external devices.

Also, the external interface 184 may be connected to a keyboard or a keypad through which data may be input from outside the phone.

The external interface 184 may use a cable or a wireless manner, and may be a connection terminal for connecting an earphone or a port for near-field communication (for example, an IrDA port, a Bluetooth port, a wireless LAN port or the like).

The memory 185 serves to store a program for operating and controlling a terminal and temporarily store data when any one of a phonebook, a message, a still image and a moving image is input or output. The image creation means 150 operates to create a laser image by receiving an image to be displayed in the display unit 120 and send the laser image to the optical means 151. The memory includes the concept of a common hard disk, card-type memory (for example, SD or XD memory), flash memory, RAM, ROM, and the like.

Depending on the control of the control unit 190, the power supply unit 181 receives the internal power or external power and supplies power necessary for the operation of each of the components.

The power supply unit 181 may be embedded in the phone body 110, and may store power that is supplied from outside through a power supply port.

The control unit 190 performs control and processes related to a voice call, data communication, a video call and the like using the mobile communication module 182, executes a command in response to the key input by receiving a signal related to the sensed command and detected motion from the sensor unit 160, and activates a call signal of the mobile communication module 182 so as to enable a user to make a phone call when it is determined that data concerning the operated key are input from the command recognition sensor 162 and that the motion detection sensor 161 operates.

Also, the control unit 190 outputs an image that is the same as the image to be displayed in the display unit 120 to the image creation means 150, whereby the laser image is projected onto the palm.

In this case, the input of a command key may be directly manipulated while viewing the display unit 120, which is configured with a touch screen, or a corresponding key may be manipulated using a finger or a pointer while viewing the image projected onto the palm.

Also, if a manipulation unit 183 for performing basic operation of the phone is formed on one side of the phone body 110, as shown in FIG. 2, any one of the manipulation unit 183, the display unit 120, and the image projected onto the palm may be selected and manipulated as needed in the state in which the laser phone is being worn.

Also, a circuit board in which components for configuring the smart laser phone of the present invention are electrically connected with each other may be included in the phone body.

An antenna radiator (not illustrated) for radiating or receiving a wireless signal may be installed in the band 130. The antenna radiator may be formed so as to have a length and pattern for sending and receiving a signal with a base station or another user while moving.

Generally, the control unit 190 controls the overall operation of the mobile terminal. For example, it performs control and processes related to a voice call, data communication, a video call and the like through the wireless mobile communication module 182.

Additionally, the control unit 190 wirelessly communicates with an earset or communicates with home appliances using the near-field communication module 182.

Also, the smart laser phone 100 may include a broadcast service reception module for receiving broadcast signals transmitted through a satellite or terrestrial channel, transforming the broadcast signals to broadcast data capable of being output through the sound output unit 170 and the display unit 120, and outputting the broadcast data to the control unit 80.

The broadcast service reception module receives supplementary data related to broadcast service (for example, an Electric Program Guide (EPG), a channel list and the like). The broadcast data, transformed by the broadcast service reception module, and the supplementary data may be stored in the memory 185.

A simple example of a method for making a phone call using the above-described smart laser phone is described below.

When it is necessary to make a phone call while the smart laser phone of the present invention is being worn on the wrist, if a phone button, displayed on the manipulation unit 183 or the display unit 120, is pressed, the control unit 190 displays the numeric keypad, through which the phone number may be input, both in the display unit and on the palm of the hand using the image creation means 150 and the optical means 151, whereby the state in which input of the phone number is waited for is prepared.

Figure 7:
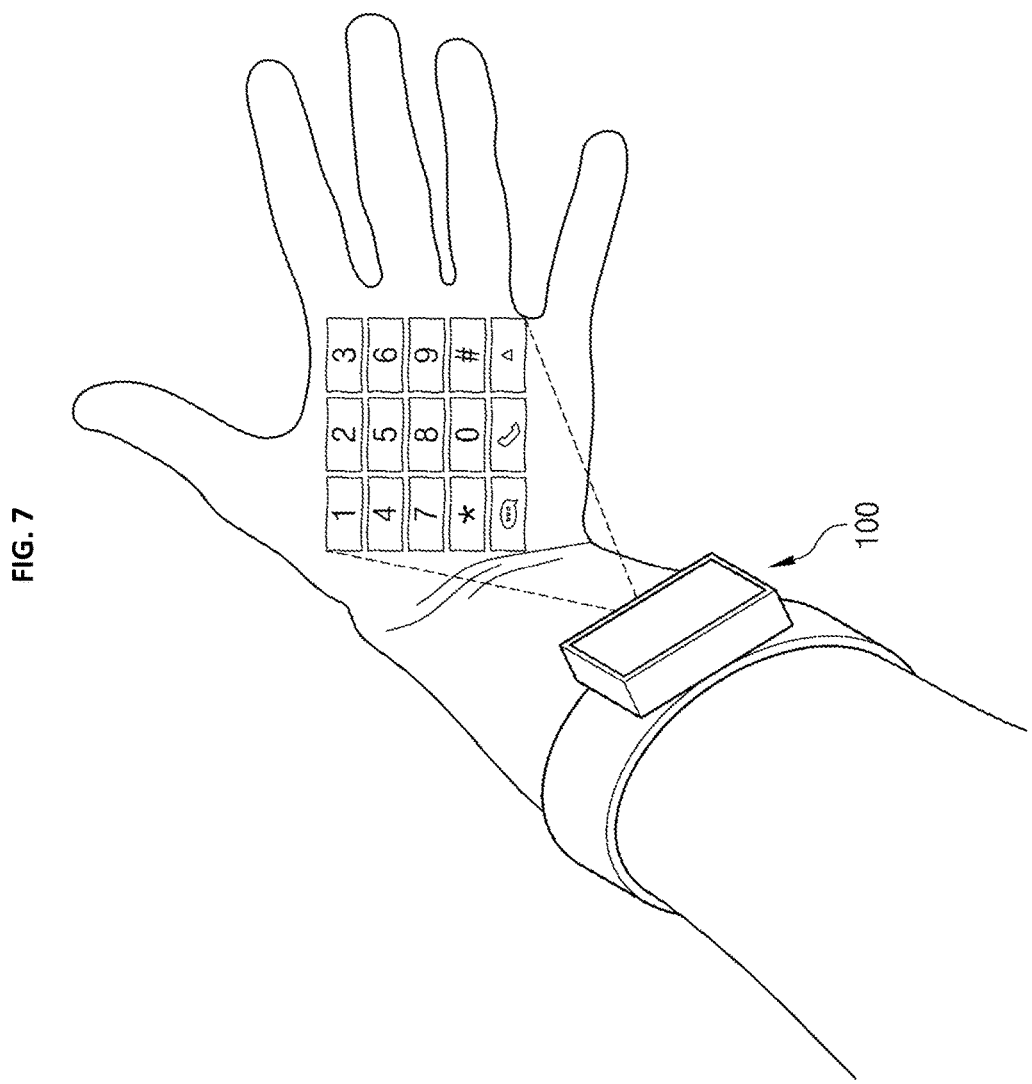
FIGS. 7 and 8 are reference drawings illustrating an example of the use of a smart laser phone of the present invention.

Referring to the reference drawing that shows an example of the use of the smart laser phone of the present invention in FIG. 7, the pattern of the numeric keypad projected from the smart laser phone 100 is displayed on the palm.

Figure 8:
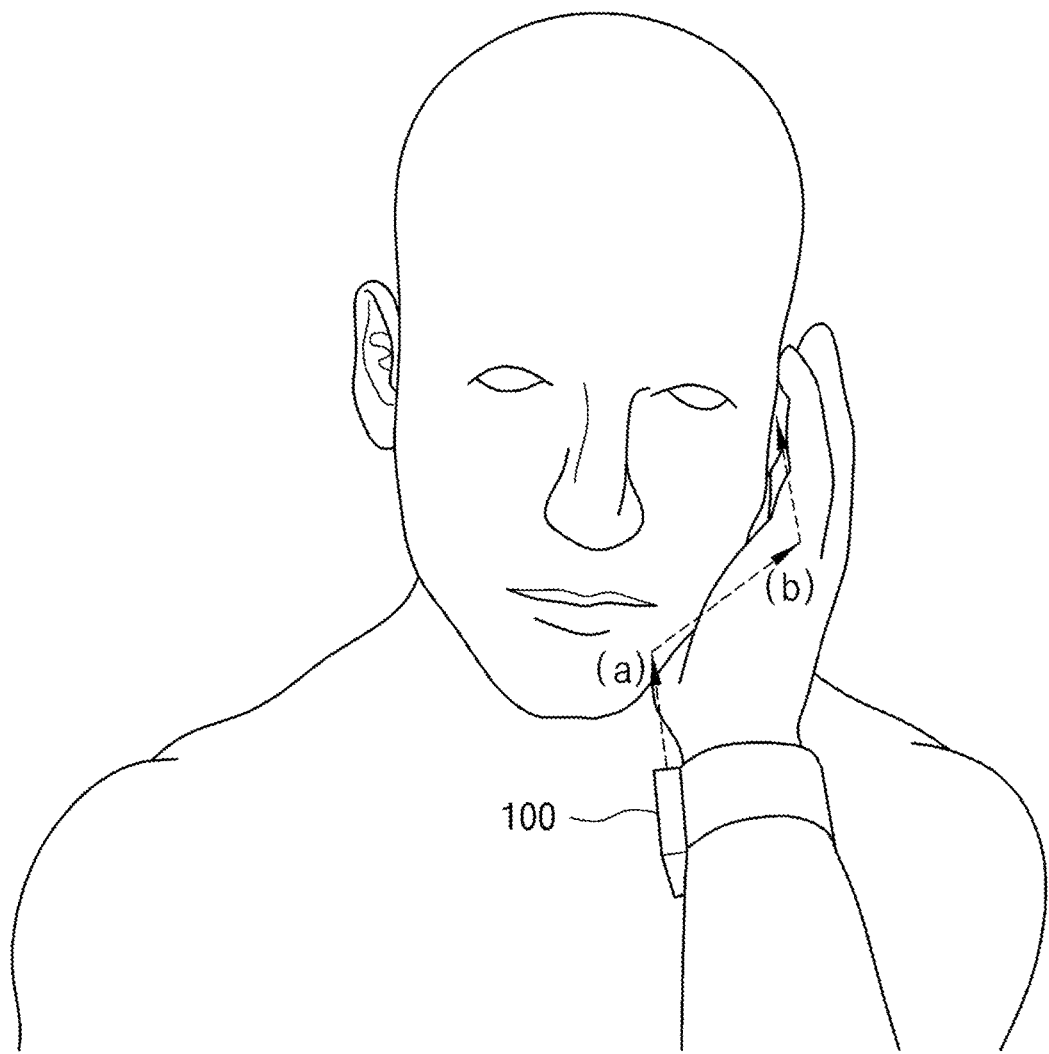

Then, when the corresponding phone number is sequentially input, the command recognition sensor 162 sequentially interprets the sensed number, and when a call button key (the pattern having the telephone symbol in the drawing) is touched, the control unit 190 does not immediately connect a call through the mobile communication module 182 but determines whether the palm has moved so as to touch the mouth and the ear, as shown in the reference drawing in FIG. 8, in order to talk on the phone using the smart laser phone 100 of the present invention by receiving the sensing signal from the motion detection sensor 161.

That is, when it is determined that the state for inputting a phone number is switched to the state for preparing for a phone call, the control unit 190 connects a call using the mobile communication module 182, and the speaker 171 and the microphone 140 operate in conjunction with the mobile communication module 182, whereby a phone call is made.

Referring to the reference drawing that shows an example of the use of the smart laser phone of the present invention in FIG. 8, the microphone 140 is placed near the mouth of a caller, and the voice output from the speaker 171 may be delivered to the ear in such a way that the voice is transmitted along the curved shape of the palm.

Therefore, if the smart laser phone of the present invention is worn on the inside of the wrist, that is, on the same side as the palm, the phone may be used more conveniently.

Consequently, the sound output from the speaker of the phone is first reflected from the part near the cheek (a), and the reflected sound is reflected again from the part in the palm (b), whereby the sound is delivered to the ear.

Referring to FIG. 8, it looks similar to the case in which a receiver is held to the ear when receiving a phone call. The appearance may be a little different, but when making a phone call, a caller opens his or her hand, bends the palm of the hand as if scooping water with the hand, places the microphone installed in the phone near the mouth, and puts the bent palm to the ear.

It is desirable to put all the fingers together, and if the phone call is made while the middle finger touches the upper part of the ear, the bent palm amplifies the voice of the opposite party using resonance, whereby the voice may be clearly heard.

Although not illustrated, in another embodiment, the smart phone of the present invention may be used without the laser projection function for a smart phone wearable on the wrist.

That is, if a key is manipulated using the image displayed in the display unit without the laser projection function, when the use of a speaker and/or a microphone is required, the use of the speaker and/or the microphone is not immediately activated but the use of the speaker and/or the microphone is activated only when the motion detection sensor 161 operates.

In this case, the present invention is characterized in that, when a specific key related to the motion detection sensor is pressed, the related function is activated depending on whether the motion detection sensor operates.

As described above, although the present invention has been described with reference to a specific embodiment, it will be clearly understood by those skilled in the art that various changes and modifications are possible within the scope of the technical spirit of the present invention, and these changes and modification also fall within the scope of the accompanying claims.

The present invention relates to a smart laser phone, in which, while the smart laser phone is worn on the wrist, an image is created by projecting a laser beam onto the palm of the hand and the image on the palm may be touched with a finger, whereby the smart laser phone may operate like a common smart watch. Therefore, it may be used in place of a smart phone.

The invention claimed is:

1. A smart laser phone, comprising:
   a laser phone body having a mobile communication module;
   a band connected to opposite ends of the laser phone body or connected to a back of the laser phone body;
   a speaker formed on a side of the laser phone body to which the band is not connected;
   a microphone formed on the side of the laser phone body to which the band is not connected but spaced apart from the speaker by a predetermined distance;
   a sensor unit, formed on a side between the speaker and the microphone, the sensor unit including a motion detection sensor for detecting positional movement of the smart laser phone and a command recognition sensor for determining whether any one of patterns projected onto a palm of a hand is touched; and
   an optical member formed on the side of the laser phone body to which the band is not connected, and specifically, formed on a side between the microphone and the sensor unit, for projecting a laser image,
   wherein:
   when the smart laser phone is worn on a wrist, the microphone, the sensor unit and the speaker are sequentially arranged on the side of the laser phone body in a direction that faces the palm, and
   when positional movement is detected through the motion detection sensor after a call connection command is input by the command recognition sensor, a laser phone control unit activates a call connection of the mobile communication module.

2. The smart laser phone of claim 1, wherein the laser phone body comprises:
   the mobile communication module for transmitting and receiving voice data, text data, image data and control data by transmitting and receiving wireless signals to and from a mobile communication base station using an antenna radiator, the mobile communication module including a transmission unit for encoding a signal to be transmitted and transmitting the signal and a reception unit for decoding a received signal;
   a sound output unit for outputting sound data, received from the mobile communication module in a call signal reception and calling mode, a recording mode, a voice recognition mode, or a broadcast service reception mode, to the speaker, or for converting sound data stored in memory and outputting the converted sound data to the speaker;
   memory for storing a program for processing and controlling the laser phone, and for temporarily storing input/output data corresponding to any one of a phonebook, a message, a still image and a moving image;
   an image creation member for creating a laser image by receiving an image to be displayed and for transmitting the laser image to the optical member; and
   a control unit for performing control and processes related to a voice call, data communication, a video call and the like using the mobile communication module.

3. The smart laser phone of claim 2, further comprising a display unit for displaying a User Interface (UI) or a Graphic User Interface (GUI), related to a call, the display unit being used as an input apparatus related to manipulation of a key that is input by a user in order to control operation of a terminal,
   wherein when an image is displayed in the display unit, the control unit simultaneously projects the image through a laser using the image creation member.

4. The smart laser phone of claim 3, wherein
   the image creation member comprises
   three lasers for emitting a laser beam by receiving the image to be displayed in the display unit;
   a deflection member for deflecting the laser beam along lines in an x direction and a y direction; and
   a control apparatus for controlling the deflection member and an intensity of the laser beam,
   the optical member is electrically connected with the image creation member and operates to enlarge a deflection region, formed by the laser beam emitted from the deflection member, so as to have a size of the palm, and the control apparatus receives the image to be displayed in the display unit and controls the intensity of a laser beam such that a laser having an intensity that is not injurious to a person is radiated to the palm through the optical member.

5. The smart laser phone of claim 4, wherein the deflection member comprises:
a polygonal mirror for deflecting a laser beam to the line in the x direction, the polygonal mirror having an outer circumference that is formed in polygonal surfaces in order to uniformly emit the laser beam, radiated from the lasers, in a raster scan manner; and
a rotational mirror for deflecting the laser beam, emitted from the polygonal mirror, in the y direction.

* * * * *